July 2, 1968  R. J. NEBESAR  3,391,050

GLASS FILAMENT TAPE

Filed April 3, 1964

INVENTOR.
ROBERT J. NEBESAR
BY
ATTORNEY

United States Patent Office 3,391,050
Patented July 2, 1968

3,391,050
GLASS FILAMENT TAPE
Robert J. Nebesar, Palos Verdes Estates, Calif. (%
Douglas Aircraft Co., Inc., 3000 Ocean Park Blvd.,
Santa Monica, Calif. 90405)
Filed Apr. 3, 1964, Ser. No. 357,143
8 Claims. (Cl. 161—143)

ABSTRACT OF THE DISCLOSURE

High strength fiber glass tape comprising a plurality of collimated high strength glass yarns in closely compacted relation but substantially free of contact with each other, said tape being about one yarn thick, and a partially cured resin binder impregnating said yarns and substantially surrounding each of the yarns and filling the spaces between adjacent yarns, such tape having a glass yarn content of about 65 to about 70% by volume and about 80% to about 85% by weight, said tape being particularly suited for producing laminates, windings or pressure moldings of high uniformity and of high tensile and compressive strength.

---

This invention relates to a continuous glass filament-reinforced tape, impregnated with resin, and is particularly concerned with a continuous glass filament or glass yarn reinforced tape of uniform dimensions, and wherein the individual glass yarns are collimated and highly compacted, resulting in a tape having high strength in which all of the filaments contained therein retain a strength comparable to that of the virgin glass filaments.

Glass filament tape is used to advantage in filament winding of pressure vessels, especially for the fabrication of high compression strength vessels. Such glass-wound structures provide important strength advantages, especially in thick-walled constructions designed to resist both internal and external pressures.

Patents have been granted for manufacturing glass filaments with proper finish or sizing for resin-impregnation to form yarns, strands and multiple strands and rovings. These, however, are not collimated and also are not highly compacted, high-strength glass filament impregnated materials which are required for the winding of high-strength vessels and casings.

In high-strength glass tapes, the individual strands or yarns of the tape should be parallel or collimated throughout the length of the tape. However, the more compacted the tape, that is, the larger the number of glass yarns in a given cross-section of tape, e.g., a one-inch wide tape, the more difficult it is to maintain such parallel alignment. Thus, in the prior art, compaction has generally been sacrificed for proper alignment. For example, glass yarn of a generally employed commercially available high-strength type known as E glass, if properly tensioned, has a diameter of 0.0054 inch. It would require 185 such yarns to completely fill a one-inch width of tape. The prior art, however, generally employed only about 120 yarns per inch because of the difficulty of maintaining the yarns in proper alignment if this number was exceeded. Heretofore, according to the prior art, it has not been possible to place more than about 120 yarns of such glass filaments in a one-inch wide tape without damaging many fibers by squeezing them and without overlapping of some yarns. The individual yarns are maintained in position by a suitable resin. Using only 120 yarns per inch, a substantial proportion of resin, i.e., about 0.34 inch, is required to fill the spaces between the yarns for providing a one-inch wide tape. But resin provides only very little strength.

Thus, conventionally wound fiber glass structures (1) have not achieved the full strength available in the glass filaments because of damage and subsequent breakage of filaments as result of cross-overs of filaments during processing, and non-uniform straining of the filaments due to filament cross-overs, non-uniform positioning of the filaments in the matrix, roping of strands, and undesirable local build-ups of strands, and (2) for a given cross sectional area of such structures the strength is substantially reduced due to the relatively large amount of binding resin present in relation to the volumetric glass content.

Accordingly, one object of the invention is to produce a high-strength glass filament or glass yarn resin-impregnated tape having a substantially high glass content as compared to prior art glass filament tapes.

Another object is the provision of a preimpregnated glass yarn tape in which the glass yarns are uniformly collimated and highly compacted.

A still further object of the invention is to provide a glass yarn collimated, preimpregnated tape having a glass content approaching the glass content theoretically possible in a tape of a given width, e.g., a one-inch tape.

Still another object of the invention is the provision of a high-strength preimpregnated, single-yarn thickness, continuous glass yarn tape, which is particularly designed for the winding or laminating of highly compacted, substantially void-free laminates.

Still another object is the provision of a glass yarn, resin-impregnated tape having substantially more than 120 glass yarns per inch of tape width, in parallel or collimated relation, with the individual yarns maintained in collimated alignment substantially without touching one another, throughout the length of the tape.

A still further object is to provide a high-strength, continuous glass yarn, resin-impregnated tape of high resin content which avoids the above-noted shortcomings of the prior art.

A still further object is to provide a compact, substantially void-free laminate or winding formed of layers of the high-strength fiber glass tape noted above, said laminate or winding having a high glass content and therefore a correspondingly high strength.

Other objects and advantages of the invention will be apparent hereinafter.

The above objects are accomplished and a high-strength, continuous glass filament or glass yarn, resin-impregnated tape provided by forming an upper web and a lower web of yarns, adjacent yarns of each of such webs being spaced apart slightly greater than the thickness of one yarn, and offsetting the individual yarns of the upper web so that they overlie the spaces between adjacent yarns of the lower web. The two webs of yarns, each uniformly tensioned, are suitably guided onto an assembly means, for example, a rotating assembly drum, so that the individual yarns of the upper web of yarns lay smoothly into the valleys or spaces between the adjacent yarns of the lower web with a minimum of damage or overlapping of yarns. In this manner, the yarns are collimated and are highly compacted, yet have a small clearance between adjacent yarns necessary to accommodate sufficient binding resin between the adjacent yarns needed to form the thus collimated group of yarns into a resin-impregnated fiber glass tape.

The thus collimated and compacted, substantially planar, ribbon of yarns is impregnated with a liquid resin, and the resulting tape is partially cured, as by heating to a stage where the tape is just slightly tacky, and is then wound on a reel. As will be pointed out in greater detail hereinafter, the tape so formed has a substantially larger number of yarns for a given tape width, e.g., a one-inch tape, as compared to prior art glass filament, resin-impregnated tapes, and has a thickness approximately one yarn thick. Accordingly, the glass content of such continuous collimated glass yarn tape of the invention is substantially greater than that of the conventional tapes, and results in a tape having a substantially higher tensile strength, as compared to such prior art tapes, the filaments of the invention tape approaching the tensile strength corresponding to the virgin glass filaments per se. Further, because of the uniformity and collimation of the glass filament tape of the invention, substantially higher glass contents are obtainable in multiple-layered tape filament wound structures or laminates by orderly nesting of the adjacent glass yarns of the tape without cross-overs.

The individual glass yarns from which a glass yarn tape is produced have a certain amount of twist in them. This twist may be either in a clockwise direction or in a counterclockwise direction. The clockwise twist is known as an S twist, and the counterclockwise twist is known as a Z twist. If all of the glass yarns in a tape are twisted in the same direction, there is a tendency for the tape to curl. As an additional feature of the instant invention, by employing glass yarns having an S twist in the upper web of yarns, and yarns having a Z twist in the lower web of yarns, when these two webs of yarn are nested together as described above to form the collimated glass yarn tape of the invention, every other strand of yarn forming the tape has an opposite twist. The result is that the preferred glass yarn tape of the invention, having alternate S and Z twist glass yarns, is free from any curling tendency.

The process for producing the fiber glass tapes of the invention and a system or machine for carrying out such process are described in my copending application, Ser. No. 357,152, filed of even date herewith, and the detailed description of such process is incorporated herein by reference.

The invention will be more readily understood by reference to the description below, taken in connection with the accompanying drawing wherein.

Figure 1:
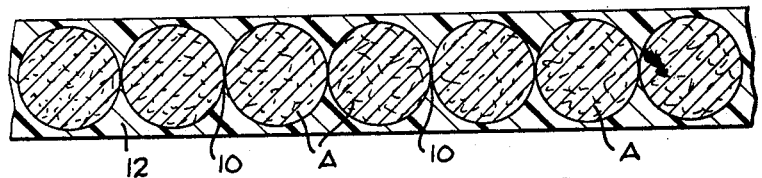
FIG. 1 illustrates a section of an ideal, completely collimated glass filament resin-impregnated tape, about one yarn thick, having the theoretically maximum glass yarn content.

The figures of the drawing are essentially schematic and greatly exaggerated in the interest of clarity.

The maximum theoretical collimation and compaction of glass yarns in a glass yarn, resin-impregnated tape is shown in FIG. 1. Here it is seen that the glass yarns A are in collimated side-by-side closely nested relation with adjacent sides of the yarns in contact with each other, as indicated at 10. It is seen that this arrangement would produce a glass-filament tape having the ideal maximum glass content and minimum resin content, and would therefore have the greatest tensile strength. However, such efficiency cannot be obtained in preimpregnated tapes because of variations in filament diameters, non-uniform spacing and compaction in strands of yarn, and particularly the mechanical impracticability of placing filaments perfectly touching each other, while, at the same time providing a satisfactory protective resin coating around them, that is, a resin coating which completely impregnates the filaments of the yarns and fills the spaces between adjacent yarns, without causing damage and breakage of the filaments prior to and during impregnation. Hence, viewing FIG. 1, it is seen that the impregnating resin 12 would not sufficiently hold adjacent glass yarns together.

Figure 2:
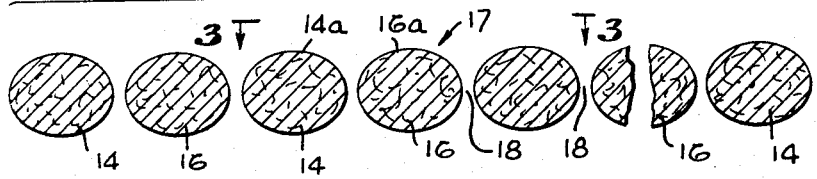
FIG. 2 illustrates a section of a ribbon of glass yarns in collimated compacted arrangement according to the invention.
Figure 4:
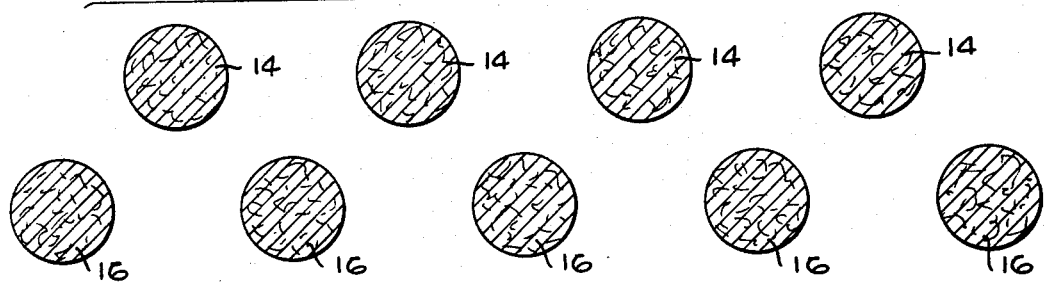
FIG. 4 illustrates schematically the method of forming the glass yarns into the collimated compacted arrangement shown in FIG. 2.
Figure 5:
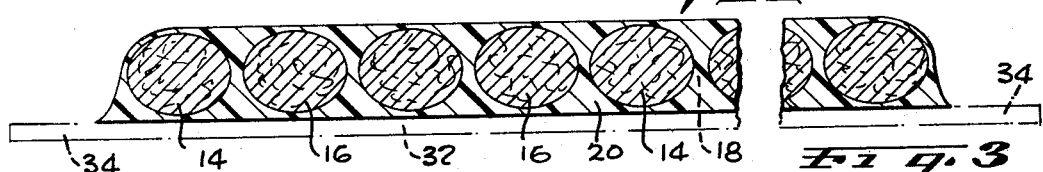
FIG. 5 illustrates a section of the resin-impregnated tape of the invention, formed by resin-impregnation of the ribbon of glass yarns shown in FIG. 2.
Figure 6:
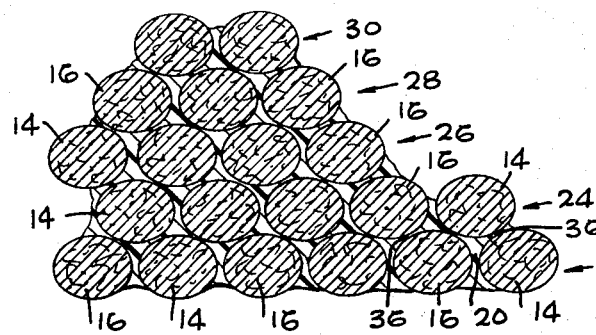
FIG. 6 illustrates a section of a laminate or glass filament wound structure produced employing the collimated, highly compacted glass yarn tape of the invention.
Figure 3:
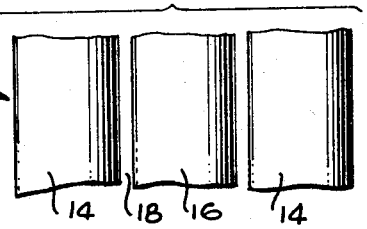
FIG. 3 is a plan view of the arrangement shown in FIG. 2.

However, the technique or process illustrated in FIG. 4, and described and claimed in my above copending application, makes it possible to form a collimated, compacted ribbon of closely spaced but separated glass yarns as shown in FIGS. 2 and 3, and to impregnate and bond together the adjacent yarns of said ribbon of yarns with a resin, to produce a collimated, preimpregnated tape of glass content only slightly lower than the theoretical glass content illustrated in FIG. 1. Such invention tape is illustrated in FIG. 5. Moreover, because of the uniformity and collimation of the yarns of such tape, substantially higher glass contents are obtainable in multiple-layer tape moldings and in wound structures by orderly nesting of the glass yarns in the tape without crossovers, as illustrated in FIG. 6.

As illustrated in FIG. 4, and according to the process of my copending application, an upper web of glass yarns 14 and a lower web of glass yarns 16 are provided, the yarns of each web having substantially the same diameter. The glass yarns 14 of the upper web are each offset from the yarns 16 of the lower web by a distance such that the upper yarns 14 are each positioned midway above the spaces between the lower web of yarns 16. Further, the spaces between the adjacent yarns 14 of the upper web and between the adjacent yarns 16 of the lower web are somewhat greater than the diameter of the glass yarns. Thus, when the upper web of yarns 14 is positioned so that the individual yarns 14 are in the same plane with the lower web of yarns 16, as indicated at 17 in FIG. 2, the glass yarns 14 are disposed midway of the spaces between the adjacent yarns 16, with only a small clearance 18 between the adjacent glass yarns 14 and 16. When such assembly of these yarns is made to take place on a rotating surface of revolution, as on an assembly drum as described in detail in my above copending application, due to the tension placed on the yarns as they curve over the surface of the assembly drum, the yarns are flattened somewhat, to form a high ellipse, as indicated at 14a and 16a in FIG. 2.

Thus, sufficient impregnating resin 20 can be provided to impregnate the spaces between the filaments of each yarn, and to fill the spaces around and between adjacent glass yarns 14 and 16 in the planar ribbon of yarns 17 to bind adjacent yarns together and form a fiberglass tape 21 as seen in FIG. 5. Because of the space 18 between adjacent yarns, there is substantially no touching of the respective yarns, and no significant damage thereto results, yet it is seen that the collimated yarns 14 and 16 of the invention tape as shown in FIG. 5 are positioned very close to each other, approaching the maximum practical compaction of glass yarns in a tape which is one yarn thick. The resulting fiberglass resin-impregnated tape of FIG. 5 accordingly has a high ratio of cross-sectional area of glass yarns to resin binder and has a high glass content approaching that of the ideal tape of FIG. 1, and accordingly has a high tensile and a high compressive strength.

Since the glass yarns were flattened somewhat during the formation of the ribbon of glass yarns, as noted above, the resulting resin-impregnated tape, as illustrated in FIG. 5, has a thickness usually less than the diameter of the yarn, e.g., of the order of about 10% less than such diameter. Hence, the expression "about one yarn thick," in reference to the thickness of the fiberglass tape of the invention, as employed herein, is intended to denote a tape thickness equal to or somewhat smaller than the diameter of the yarns, within the range of 0 to about 10% less than such diameter. Thus, when glass yarns having a diameter of 0.0054 inch are employed in producing the fiberglass tape of the invention, the resulting resin-impregnated tape can have a thickness of about 0.0050 to about 0.0054 inch.

Further, by forming the upper web of yarns 14 of S twist yarns, and the lower web of yarns 16 of Z twist yarns, or vice versa, the resulting tape is substantially free of curling tendency.

FIG. 6 is a schematic illustration of a glass tape laminate or winding formed from layers of a collimated, compacted glass yarn resin-impregnated tape of the type shown in FIG. 5, according to the invention. The laminate of FIG. 6 is shown for purposes of illustration as formed of five layers or windings of such tape. As the tape is laid up one layer on top of the other, the yarns 14 and 16 in the second layer 24 imbed themselves into the resin matrix 20 on top and in between the yarns and filaments 14 and 16 of the first layer of tape 22. The same is true for the subsequent layers 26, 28 and 30, and so on, depending on the desired thickness of the laminate or winding. As the respective layers of tape are wound, one atop the other, the resulting tensioning and compaction will tend further to flatten the yarns 14 and 16 to a minor extent, as seen in FIG. 6. The result is a laminate which is highly compact, has a high glass content, and is substantially free of voids, resulting in a laminate of improved high strength.

Reference is here made to the process of producing the fiberglass tape of the invention, described in my above copending application, and which process forms no part of the instant invention. As described in such copending application, the ribbon of glass yarns 17 shown in FIG. 2, is formed, as described above, on an assembly drum and is then guided through a resin-impregnating bath containing a liquid resin, usually in solution in a suitable organic solvent. A variety of resins can be employed to impregnate and hold together the adjacent glass yarns 14 and 16 of the tape and to form the resin matrix thereof. The most widely used resins for this purpose are polyesters, phenolics, melamines, epoxies and silicones. For making high-strength glass filament tapes, epoxies are preferred. Their compatibility with glass filaments or yarns, and their low shrinkage make it possible to obtain excellent strength properties in the resulting fiberglass tape. For example, the commercially available Epon resins marketed by Shell, and which are epoxies and condensation products of epichlorohydrin and Bisphenol A, are highly suitable as a bonding matrix for the high-strength glass yarn tape of the invention. The resins are usually mixed with catalysts or hardeners, or both, before impregnation of the resin in the glass yarn ribbon 17.

As described in my above copending application, after passage through the resin bath, the exiting tape is then guided through an air-heated curing oven. The time during which this resin-impregnated tape remains in the oven and the temperature therein are such as to remove solvent from the resin and to partially cure the resin to an intermediate or so-called B stage cure. A paper carrier tape backing 32, indiciated by phantom lines in FIG. 5, preferably is provided and applied to one surface of the tape after the tape leaves the resin bath and prior to its introduction into the curing oven. This backing is preferably of a width greater than the width of the tape, and extends beyond the edges of the tape, as indicated at 34 in FIG. 5. The tape, preferably with the paper backing thereon, is wound on a takeup reel (not shown) following passage of the tape through the curing oven. The fiber glass tape wound on the takeup reel preferably is in a slightly tacky condition, and the paper backing adheres to the tacky surface of such tape. Thus, for example, for a tape of one-half inch width, the paper backing 32 can have a width of one inch and extend one-quarter inch beyond each edge of the tape. This paper backing is employed chiefly to prevent undue adhesion of the separate layers of tape wound on a takeup reel, and prevent subsequent damage to the tape during unwinding thereof. The reels of fiber glass tape so produced are individually packed and sealed in plastic bags and stored under refrigeration.

The highly uniform compacted and collimated glass yarn, resin-impregnated tape of the invention has many advantages in filament winding, both for internal and external pressure vessels and in any structural configuration, including molded parts. Uniformity of winding with such tape minimizes defects resulting from excessive resin pockets and voids inherent in windings and laminates employing conventional glass yarn tapes. Further, molding the tape of the invention in the form of tape lay-ups or laminates, results in highly compacted, void-free laminates.

The continuous glass yarn, collimated, resin-impregnated tape of the invention generally contains from about 65% to about 70% by volume of glass yarns, and about 80% to about 85% by weight of such glass yarns, the remainder, or about 15% to about 20% by weight, being composed of the resin matrix. A tape having a volumetric glass loading of about 68% is usually obtained. The glass yarn tape of the invention, when formed of high-strength E glass having a diameter of about 0.0054 inch has a tensile strength in the range of about 270,000 to about 330,000 p.s.i., thereby utilizing practically all of the strength of the glass in the tape. The number of glass yarns which can be present per inch width of tape on the basis of the use of glass yarns of standard diameter of about 0.0054 inch, can range from about 150 to about 165, the preferred number being about 160 yarns per inch. Of particular importance, all of the yarns of the tape of the invention remain collimated or parallel from one end of the tape to the other, thus maintaining uniformity and strength of the tape throughout its length.

The laminates or windings produced from such fiber glass tape, and which are highly compacted, have a glass content of about 70% to about 80% by volume, usually about 75% to about 80%, and when formed of a high-strength E glass tape according to the invention, such windings can have a hoop stress of about 300,000 to about 340,000 p.s.i.

The following are examples of practice of the invention.

Example 1

E glass, high tensile strength (HTS) formed of 204 continuous filaments of 0.0036 inch diameter, having an appropriate finish or binder thereon, the finished yarn or strand having a diameter of 0.0054 inch when completed, was employed for producing a glass yarn tape according to the invention. Such yarn construction is identified by the symbol ECG150 1/0, this being a single end yarn, and is of the type generally employed to produce fiber glass tape used to form yarn windings or laminates.

A ribbon or tape formed by 80 of these yarns which would be compacted diameter to diameter in contacting relation, as illustrated in FIG. 1 of the drawing, would be 0.0054 inch thick and 0.432 inch wide, giving an area of 0.00233 square inch. The cross-sectional area of the glass in each yarn is approximately $2.066 \times 10^{-5}$ square inch. Since there are 80 yarns in the ribbon, the glass area is 0.00165 square inch, which corresponds to a maximum glass content of 71% by volume.

A glass yarn tape using the above-noted E glass yarns was formed according to the process of my copending application and described above and illustrated in FIG. 4. In such process 80 yarns were employed, 40 yarns of S twist yarns 14 in the upper web, and 40 yarns of Z twist yarns 16 in the lower web to produce a one-half inch width tape. The lower web of 40 yarns of Z twist reaching the assembly drum of the copending application machine had about a .007 inch space between each of the yarns in the web. The upper web of yarns 14 containing 40 S twist yarns then occupied these spaces, thus providing the ribbon of yarns from which the highly compacted, collimated tape hereof was produced. Since there was about 0.001 inch space between clearance between the yarns, there was no significant damage to the filaments. Because of the tensioning of the tape during the process described above, the yarns of the tape tended to flatten slightly from 0.0054 inch diameter to an approximately 0.0050 inch high ellipse.

Such ribbon of yarns 17, as illustrated in FIG. 2, was impregnated with a catalyzed epoxy resin. The resulting collimated, highly compacted glass yarn tape illustrated in FIG. 5 of the drawing, having 80 yarns and 0.5 inch in width, with the yarns spaced from each other and impregnated with and surrounded by resin binder, and having a thickness of 0.0050 inch, had 67% glass fibers by volume and a resin content of 19% by weight of the epoxy resin.

It will be noted that the 67% by volume glass content of the tape of the invention described above closely approaches the 71% maximum volumetric glass content of the ideal tape noted above in FIG. 1 of the drawing.

A conventional glass yarn tape formed from the above E glass yarns of 0.0054 inch diameter had 60 yarns in a 0.5 inch width of tape, and contained approximately 50% by volume of glass, the glass yarns being impregnated with the same epoxy resin as the invention tape described above. The tensile strength of such conventional tape having 120 glass yarns per inch width of tape was about 200,000 p.s.i. On the other hand, the tensile strength of the tape produced according to the invention, and having 160 of the same glass yarns per inch, was about 270,000 p.s.i., an increase in tensile strength of about one-third over that of the conventional tape.

Example 2

A number of layers of the glass yarn tape of the invention produced in Example 1 above, and containing approximately 80 yarns per one-half inch width of tape, were wound on a six-inch diameter cylinder. The compaction of such tape wound on the cylinder was such that the laminate contained a glass content of about 75% by volume substantially higher than the 67% by volume for the tape itself, due to the nesting of the respective layers of tape, and resulting compaction, as indicated at 36 in FIG. 6 of the drawing. On the other hand, the glass content for a conventional laminate formed from glass yarn tape of conventional type described in Example 1 above, and containing about 60 yarns per one-half inch width of tape was only about 67% of glass by volume. This is an increase of 12% volumetric glass content in the laminate produced using the tape of the invention over the volumetric glass content of the laminate produced by winding the conventional glass tape. Such high glass content, uniformity of yarns and absence of large resin pockets and voids in the laminates or windings produced employing the glass yarn tape of the invention, together with an improved degree of transparency of such laminate, which is an important feature for quality control, are important advantages of such windings or laminates formed from the invention tape. Photomicrographs of laminates or windings produced from the invention tape showed no large resin pockets or voids in such laminate, while the laminates or windings formed from the conventional glass yarn tape or rovings generally contained many such large resin pockets and voids. Due to the absence of such voids in such laminates or windings, and the high compaction and high glass content thereof, such laminates or windings have high compressive strength, superior to the non-uniform laminates or windings containing voids formed using conventional fiber glass tapes.

Example 3

Thirty tape layers of glass yarn tape, according to the invention, were laid up in the cavity of a metal die or mold in a heated press. A positive pressure was maintained during the curing cycle of the laminate. The resulting molded laminate thickness obtained after curing, was approximately ⅛ inch, corresponding to a thickness per tape ply of 0.00416 inch. The volumetric glass content of such molding was 79½%. Photomicrographs of such moldings showed very high compaction and uniformity throughout this thickness of laminate, with no large resin pockets or voids. The laminate exhibited a very high degree of transparency through its thickness.

Example 4

Tests on thin-walled hoop windings on small cylinders 3 inches in diameter and 9 inches long were carried out.

The glass yarn tape produced in Example 1 and formed of E glass high tensile strength (HTS) yarn was circumferentially wound on the test cylinders to produce the cylindrical laminate. Burst tests were carried out on the 3″ diameter cylinder windings. An average hoop stress of 305,000 p.s.i., and corresponding to an average glass stress for the windings of 455,000 p.s.i., was obtained.

The glass stress value for the glass content of the laminate is close to the approximate actual filament strength of about 500,000 p.s.i. for the high tensile strength virgin E glass yarn employed. Thus, it is seen that by employing the collimated, highly compacted high-strength fiber glass tape of the invention for producing laminates or windings, almost the full strength of the glass content of such laminates or windings can be obtained.

From the foregoing, it is seen that the invention provides a continuous preimpregnated tape formed of parallel or collimated, highly compacted glass yarns, having high tensile strength, and utilizing practically the entire strength of the glass present in the tape. Such tapes are eminently suited for producing laminates, windings or pressure moldings of high uniformity, and which are substantially void-free and substantially free of large resin pockets, resulting in structures of high tensile and compressive strength.

It will be understood that the specific dimensions of the glass yarns and tapes formed therefrom and set forth herein, are merely illustrative, and that tapes formed from glass yarns having larger or smaller diameters than those specifically described herein, can be employed to produce resin impregnated fiber glass tapes having greater or smaller thicknesses and/or widths than those described herein, according to the principles of the invention.

While I have described particular embodiments of my invention for the purpose of illustration, it should be understood that various modifications and adaptations thereof may be made within the spirit of the invention, as set forth in the appended claims.

I claim:

1. A high strength fiber glass tape comprising a plurality of collimated high strength glass yarns in closely compacted relation but substantially free of contact with each other, said tape being about one yarn thick, alternate yarns having a clockwise twist and adjacent alternate yarns having a counterclockwise twist, and a partially cured resin binder impregnating said yarns and substantially surrounding each of said yarns and filling the spaces between adjacent yarns, said tape being tacky and having a glass yarn content of about 65% to about 70% by volume and about 80% to about 85% by weight, said tape having a tensile strength in the range of about 270,000 to about 330,000 p.s.i.

2. A high strength fiber glass tape comprising about 150 to about 165 high strength collimated glass yarns per inch width of tape, said yarns each having a diameter of about 0.0054 inch, said yarns being in closely compacted relation but substantially free of contact with each other, said tape being tacky and having a thickness approximately that of the diameter of one of said yarns, alternate yarns having a clockwise twist and adjacent alternate yarns having a counterclockwise twist, and a partially cured resin binder impregnating said yarns and substantially surrounding each of said yarns and filling the spaces between adjacent yarns.

3. A high strength fiber glass tape comprising a plurality of collimated high strength glass yarns in closely compacted relation but substantially free of contact with each other, said tape being about one yarn thick, alternate yarns having a clockwise twist and adjacent alternate yarns having a counterclockwise twist, and a partially cured epoxy resin binder impregnating said yarns and substantially surrounding each of said yarns and filling the spaces between adjacent yarns, said tape being tacky and having a glass yarn content of about 65% to about 70% by volume and about 80% to about 85% by weight, said tape having a tensile strength in the range of about 270,000 to about 330,000 p.s.i.

4. A high strength fiber glass tape comprising about 150 to about 165 high strength collimated glass yarns per inch width of tape, said yarns each having a diameter of about 0.0054 inch, said yarns being in closely compacted relation but substantially free of contact with each other, said tape having a thickness about equal to the diameter of one of said yarns, alternate yarns having a clockwise twist and adjacent alternate yarns having a counterclockwise twist, and a partially cured epoxy resin binder impregnating said yarns and substantially surrounding each of said yarns and filling the spaces between adjacent yarns, said tape being tacky and having a glass yarn content of about 65% to about 70% by volume and about 80% to about 85% by weight.

5. A high strength fiber glass tape comprising about 160 high strength collimated glass yarns per inch width of tape, said yarns each having a diameter of about 0.0054 inch, said yarns being in closely compacted relation but substantially free of contact with each other, the space between adjacent yarns being about 0.001 inch, said tape being tacky and having a thickness approximately that of the diameter of one of said yarns, alternate yarns having a clockwise twist and adjacent alternate yarns having a counterclockwise twist, and a partially cured resin binder substantially surrounding each of said yarns and filling the spaces between adjacent yarns.

6. A high strength fiber glass tape free from curling, comprising about 160 high strength collimated glass yarns per inch width of tape, said yarns each having a diameter of about 0.0054 inch, said yarns being in closely compacted relation but substantially free of contact with each other, the space between adjacent yarns being about 0.001 inch, said tape having a thickness of about 0.0050 to about 0.0054 inch, alternate yarns having a clockwise twist and adjacent alternate yarns having a counterclockwise twist, and a partially cured epoxy resin binder impregnating said yarns and substantially surrounding each of said yarns and filling the spaces between adjacent yarns, said tape being tacky and having a glass yarn content of about 65% to about 70% by volume and about 80% to about 85% by weight.

7. A high strength fiber glass tape winding comprising a plurality of closely compacted layers of a fiber glass tape comprising about 150 to about 165 high strength collimated glass yarns per inch width of tape, said yarns each having a diameter of about 0.0054 inch, said yarns being in closely compacted relation but substantially free of contact with each other, said tape having a thickness approximately that of the diameter of one of said yarns, alternate yarns having a clockwise twist and adjacent alternate yarns having a counterclockwise twist, and a cured resin binder impregnating said yarns and substantially surrounding each of said yarns and filling the spaces between adjacent yarns, said winding being substantially void-free, and having a glass content of about 70% to about 80% by volume.

8. A high strength fiber glass tape winding comprising a plurality of closely compacted layers of a fiber glass tape comprising about 160 high strength collimated E glass yarns per inch width of tape, said yarns each having a diameter of about 0.0054 inch, said yarns being in closely compacted relation but substantially free of contact with each other, said tape having a thickness approximately that of the diameter of one of said yarns, alternate yarns having a clockwise twist and adjacent alternate yarns having a counterclockwise twist, and a cured resin binder substantially surrounding each of said yarns and filling the spaces between adjacent yarns, said winding being substantially void-free, and having a glass content of about 70% to about 80% by volume.

References Cited
UNITED STATES PATENTS

| | | | |
|---|---|---|---|
| 2,477,555 | 7/1949 | Roberts et al. | 161—143 |
| 3,030,247 | 4/1962 | Schurb | 161—143 |
| 3,054,707 | 9/1962 | Logrippo | 161—144 |
| 3,118,806 | 1/1964 | Grantham | 161—143 |

MORRIS SUSSMAN, *Primary Examiner.*